3,586,721
STABILIZED FORMALDEHYDE
Donald B. Griffin, Tuscaloosa, Ala., assignor to Reichhold Chemicals, Inc., White Plains, N.Y.
No Drawing. Continuation-in-part of abandoned application Ser. No. 234,562, Oct. 31, 1962. This application June 27, 1966, Ser. No. 560,852
Int. Cl. C07c 47/04
U.S. Cl. 260—606                                    11 Claims

ABSTRACT OF THE DISCLOSURE

An aqueous solution stabilized against precipitation of formaldehyde polymers, the solution comprising water, formaldehyde dissolved therein and a stabilizing amount of a compound having the general formula:

$$H(CH_2)_m-R-O-(C_2H_4O)_nH$$

wherein R is the aromatic radical $-C_6H_4-$, wherein $m$ is an integer ranging from 4 to 10, and wherein $n$ is an integer ranging from 5 to 15 to stabilize said solution against deposition of solid material from the solution.

---

The present invention is a continuation-in-part of my application Ser. No. 234,562, filed Oct. 31, 1962, now abandoned.

This invention relates to stabilize formaldehyde solutions. More particularly, this invention relates to aqueous formaldehyde solutions stabilized against excessive polymerization and precipitation of the polymerized formaldehyde from the solution.

It is well known that aqueous formaldehyde solutions containing more than about 30 weight percent of formaldehyde are unstable upon storage, particularly at low temperatures. Thus, commercial formaldehyde solutions containing, for example, about 37% of formaldehyde and not more than about 1% of methanol (a commercially available grade) are stable at storing temperatures above about 90–95° F. (32–35° C.). When such a solution is stored at temperatures significantly below 90° F. the solution is unstable and formaldehyde polymers gradually form which precipitate from the solution. Similarly, commercial formaldehyde solutions containing about 44% of formaldehyde and not more than about 1% of methanol (a commercially available grade) must be stored at temperatures above about 125° F. (52° C.) if formaldehyde precipitation is to be avoided.

It is well known that methanol, for example, when present in formaldehyde solutions works to prevent or minimize the aforementioned precipitation of formaldehyde polymers. Although methanol, for example, is at least partially satisfactory for stabilizing formaldehyde solutions against precipitation of formaldehyde polymers, it has a number of disadvantages. In certain applications in the production of formaldehyde-containing resinous products the presence of methanol in the formaldehyde solutions employed is deleterious, and must be avoided. In other similar applications the presence of methanol in the formaldehyde solution is neither harmful nor beneficial and the methanol is simply wasted. Still further, the use of methanol in the substantial amounts necessary to stabilize formaldehyde solutions represents an added monetary cost, either to the producer or to the user of such stabilized formaldehyde solutions.

In addition to the use of methanol as a stabilizer for formaldehyde solutions, the use of other materials has been proposed. For example, the use of buffering salts and ammonium-ion producing compounds is claimed in U.S. Patent 2,267,290. Such a stabilized formaldehyde solution is not suitable for use in the production of amine-formaldehyde synthetic resins to be used as plywood adhesives. The use of melamine and/or methylol melamine as formaldehyde solutions stabilizers is claimed in U.S. Patent 2,237,092. Such as stabilized formaldehyde solution is not suitable for use in the production of certain phenol-formaldehyde resins. Various organic compounds or chemicals are also claimed to have stabilizing properties in U.S. Patents 3,137,736; 3,152,189; and 3,183,271 for example. These organic chemical or compounds cause the formaldehyde solutions containing them to undesirably foam when, for example, these solutions are employed in the manufacture of formaldehyde containing resins. The above-mentioned three U. S. patents disclose the need for and use of additional anti-foaming chemicals in the stabilized formaldehyde solutions containing the organic compounds specified in U.S. Patents 3,137,736; 3,152,189 and 3,183,271.

It is significant that heretofore the most effective compounds for stabilizing formaldehyde solutions have been nitrogen bearing compounds. For example, the use of melamine (U.S. Patent 2,237,092), ammonium-ion containing compounds (U.S. Patent 2,267,290), amino acids (U.S. Patent 2,492,453), urea (U.S. Patent 2,000,152), secondary amines (U.S. Patent 1,763,326), Betaines (U.S. Patent 3,152,189), amides (U.S. Patent 3,192,268), or oxazalines (U.S. Patent 3,209,035) are all stated to be satisfactory stabilizers. It is surprising, therefore, to discover that compounds derived from phenol and containing no nitrogen are excellent stabilizers for aqueous formaldehyde solutions.

It is an object of this invention, therefore, to produce stable formaldehyde solutions containing more than 30 weight percent of formaldehyde. A further object of this invention is the provision of stabilizers for formaldehyde solutions which are effective even when present in the formaldehyde solutions in very low concentrations. A still further object of this invention is the provision of novel stabilizers for formaldehyde solutions which do not require the use of anti-foaming chemicals to prevent the stabilized formaldehyde solutions from foaming. Other objects of this invention will be apparent from the detailed description and claims.

I have discovered means whereby the above-mentioned objectives can be accomplished and formaldehyde solutions of commercial concentrations can be substantially preserved against polymerization and deposition of solid material even when subjected to temperatures at which unstabilized formaldehyde solutions deposit substantial amounts of polymerized formaldehyde.

Generally my invention involves addition of polymerization retarding amounts of compounds or mixtures of compounds having the following general formula to formaldehyde solutions:

$$H(CH_2)_m-R-O-(C_2H_4O)_nH$$

wherein R is the aromatic radical $-C_6H_4-$, wherein $m$ is an integer ranging from 4 to 10, and wherein $n$ is an integer ranging from 5 to 15.

In my stabilizing compounds the $H(CH_2)_n-$ group may be derived from alkenyl hydrocarbon such as butene, pentene, octene, nonene, or the like. The $-R-O-$ group is derived from phenol (carbolic acid, $C_6H_5OH$) while the $(C_2H_4O)-$ groups are derived from ethylene oxide by known methods.

In carrying out my improved process, I have found that when amounts as low as 10 p.p.m. and as high as 1000 p.p.m. by weight, of my stabilizers, based on the weight of formaldehyde solution, are incorporated in the formaldehyde solution, desirable results can be obtained. However, for optimum results, I usually prefer to utilize from about 50 to about 250 p.p.m. of my stabilizer.

The following examples serve to illustrate my invention, but it is not intended that the invention be limited to the examples given.

EXAMPLE I

A quantity of aqueous formaldehyde solution containing approximately 44% by weight of formaldehyde, less than 1% by weight of methanol and at a temperature between 120 and 125° F. was obtained from a storage tank for such formaldehyde. This formaldehyde solution was divided into a number of samples of substantially equal volume. To each of these samples was added an amount of one of my stabilizing compounds equal to 1000 p.p.m. of the formaldehyde solution. The samples containing the stabilized formaldehyde were stored in a constant temperature cabinet maintained at 100° F. At regular intervals the samples were removed from the cabinet, shaken and quickly examined for the presence of precipitated formaldehyde polymers.

The presence or absence of precipitated formaldehyde in the sample was determined by comparing the turbidity produced by the precipitated formaldehyde with the turbidity of appropriate dilutions of commercial No. 1000 Turbidity Stock Suspension according to the procedure for measuring turbidity prescribed in section 4.3 (page 209) in the Tenth Edition of Standard Methods for the Examination of Water, Sewage and Industrial Wastes. According to the procedure a turbidity rating of zero is equivalent to no suspended matter in the solution being examined. Increasing amounts of suspended matter in the solution being examined are indicated by increasingly larger numerical ratings.

The results obtained in the above described are summarized in Table I.

TABLE I

| Identity of stabilizer | Turbidity rating after storage for— | | | |
|---|---|---|---|---|
| | 2 days | 4 days | 8 days | 14 days |
| No stabilizer | (1) | (1) | (1) | (1) |
| $H(CH_2)_5$—R—O—$(C_2H_4O)_{14}H$ | 0–5 | 5 | 5 | 5 |
| $H(CH_2)_8$—R—O—$(C_2H_4O)_{10}H$ | 0–5 | 0–5 | 0–5 | 0–5 |
| $H(CH_2)_9$—R—O—$(C_2H_4O)_7H$ | 0–5 | 0–5 | 5 | 5 |

[1] The amount of precipitated formaldehyde caused tubridity that exceeded the highest numerical rating provided by the APHA method described above.

EXAMPLE II

A quantity of aqueous formaldehyde solution containing about 44% by weight of formaldehyde, less than 1% by weight of methanol and at a temperature of about 90° C. (194° F.) was obtained directly from a commercial formaldehyde manufacturing apparatus. This aqueous formaldehyde solution was divided into a number of samples of approximately equal volume. To each of these samples was added differing amounts of one of my preferred stabilizing compounds. The samples of formaldehyde solution containing the stabilizer were stored and periodically examined as described in Example I. The results obtained by this example are summarized in Table II.

TABLE II

[Identity of stabilizer: $H(CH_2)_8$—R—O—$(C_2H_4O)_{10}H$]

| | Turbidity rating after storage for— | | | |
|---|---|---|---|---|
| | 1 day | 2 days | 4 days | 6 days |
| Amount of stabilizer, p.p.m.: | | | | |
| None | 10 | (1) | (1) | (1) |
| 50 | 10 | 10 | 10 | 10 |
| 100 | 10 | 10 | 10 | 10 |
| 500 | 10 | 10 | 10 | 10 |
| 1,000 | 10 | 10 | 10 | 10 |

[1] The amount of precipitated formaldehyde caused turbidity that exceeded the highest numerical rating provided by the APHA method described above.

EXAMPLE III

Example II was repeated except that the formaldehyde solution was heated to its boiling point before dividing into separate portions. Thereafter the stabilizing compound was added and the samples stored in the constant temperature cabinet. The results of this experiment are shown below in Table III.

TABLE III

| | Turbidity after storage for— | | | |
|---|---|---|---|---|
| | 2 days | 14 days | 4 weeks | 8 weeks |
| Amount of stabilizer, p.p.m.: | | | | |
| None | (1) | (1) | (1) | (1) |
| 50 | 0–5 | 0–5 | 0–5 | 0–5 |
| 100 | 0–5 | 0–5 | 0–5 | 0–5 |
| 1,000 | 0–5 | 0–5 | 0–5 | 0–5 |

[1] The amount of precipitated formaldehyde caused turbidity that exceeded the highest numerical rating provided by the APHA method described above.

EXAMPLE IV

A quantity of aqueous formaldehyde solution containing approximately 37% by weight of formaldehyde and less than 1% by weight of methanol and at a temperature of about 95° F. was obtained from a storage tank for such formaldehyde. This aqueous formaldehyde solution was divided into a number of samples of approximately equal volume. To each of these samples was added an amount of one of my stabilizing compounds equal to 500 p.p.m. of the formaldehyde solution. The samples containing the stabilized formaldehyde were stored at 68–70° F. in a constant temperature bath. At intervals these samples were removed from the bath, examined for precipitated formaldehyde polymers by the method described in Example I after which they were returned to the bath.

The results observed for this example are summarized in Table IV.

TABLE IV

| Identity of stabilizer | Turbidity rating after storage for— | | | |
|---|---|---|---|---|
| | 1 day | 6 days | 8 days | 22 days |
| None | 100–200 | (1) | (1) | (1) |
| $N(CH_2)_8$—R—O—$(C_2H_4O)_{10}H$ | 0–5 | 0–5 | 0–5 | 0–5 |
| $H(CH_2)_8$—R—O—$(C_2H_4O)_{14}H$ | 0–5 | 0–5 | 0–5 | 0–5 |
| $H(CH_2)_8$—R—O—$(C_2H_4O)_7H$ | 0–5 | 0–5 | 10 | 10 |

[1] The amount of precipitated formaldehyde caused turbitity that exceed the highest numerical rating provided by the APHA method described above.

The invention has been described in detail for the purpose of illustration but numerous modifications and variations thereof may be resorted to as will be apparent to those skilled in the art, without departing from applicant's invention as set forth in the accompanying claims.

I claim:

1. An aqueous solution stabilized against precipitation of formaldehyde polymers, the solution comprising water, formaldehyde dissolved therein and a stabilizing amount of a compound having the general formula:

$$H(CH_2)_m—R—O—(C_2H_4O)_nH$$

wherein R is the aromatic radical —$C_6H_4$—, wherein $m$ is an integer ranging from 4 to 10, and wherein $n$ is an integer ranging from 5 to 15 to stabilize said solution against deposition of solid material from the solution.

2. The solution of claim 1 wherein the proportion of the stabilizing compound ranges from 0.001% by weight to 0.10% by weight of the aqueous solution.

3. The solution of claim 1 wherein the stabilizing compound has the formula:

$$H(CH_2)_8—R—O—(C_2H_4O)_{10}H$$

4. The solution of claim 1 wherein the stabilizing compound has the formula:

$$H(CH_2)_8—R—O—(C_2H_4O)_{14}H$$

5. The solution of claim 1 wherein the stabilizing compound has the formula:

$$H(CH_2)_9—R—O—(C_2H_4O)_{10}H$$

6. The solution of claim 1 wherein the stabilizing compound has the formula:

$$H(CH_2)_9—R—O—(C_2H_4O)_{14}H$$

7. The process of making and stabilizing a formaldehyde solution, which comprises dissolving monomeric formaldehyde in water in an amount to give a concentration of at least 30% of formaldehyde and dissolving therein a stabilizing compound having the general formula:

$$H(CH_2)_m—R—O—(C_2H_4O)_nH$$

wherein R is the aromatic radical $—C_6H_4—$, wherein $m$ is an integer ranging from 4 to 10 and wherein $n$ is an integer ranging from 5 to 15, said solution being maintained at a temperature above 100° F. at all times up to and including the dissolving of the stabilizing compound.

8. The process of claim 7 wherein the proportion of the stabilizing compound ranges from 0.001% by weight to 0.10% by weight of the aqueous solution.

9. The process of making and stabilizing a formaldehyde solution, which comprises dissolving monomeric formaldehyde in water in an amount to give a concentration of at least 30% of formaldehyde, heating said solution to at least 100° F. and then dissolving therein a stabilizing compound having the general formula:

$$H(CH_2)_m—R—O—(C_2H_4O)_nH$$

wherein R is the aromatic radical $—C_6H_4—$, wherein $m$ is an integer ranging from 4 to 10 and wherein $n$ is an integer ranging from 5 to 15.

10. The process of claim 9 wherein the proportion of the stabilizing compound ranges from 0.001% by weight to 0.10% by weight of the aqueous solution.

11. The process of making and stabilizing a formaldehyde solution, which comprises dissolving monomeric formaldehyde in water in an amount to give a concentration of at least 30% of formaldehyde, dissolving therein a stabilizing compound having the general formula:

$$H(CH_2)_m—R—O—(C_2H_4O)_nH$$

wherein R is the aromatic radical $—C_2H_4—$, wherein $m$ is an integer ranging from 4 to 10 and wherein $n$ is an integer ranging from 5 to 15 and thereafter heating said solution to a temperature of at least 100° F.

References Cited

UNITED STATES PATENTS

| | | | |
|---|---|---|---|
| 3,183,271 | 5/1965 | Halpern et al. | 260—606 |
| 3,137,736 | 6/1964 | Prinz et al. | 260—606 |

OTHER REFERENCES

Sisley et al.: "Encyclopedia of Surface Active Agents," 1964, volume 2.

LEON ZITVER, Primary Examiner

R. H. JILES, Assistant Examiner